United States Patent [19]

Caldwell

[11] 4,132,994

[45] Jan. 2, 1979

[54] RADIO ANTENNA FOR MOTORCYCLE

[76] Inventor: Winston A. Caldwell, Rte. 2, Box 375, Sulphur, La. 70663

[21] Appl. No.: 854,769

[22] Filed: Nov. 25, 1977

[51] Int. Cl.² .............................................. H01Q 1/32
[52] U.S. Cl. ..................................... 343/713; 343/711
[58] Field of Search ............... 343/713, 712, 711, 714, 343/715

[56] References Cited

U.S. PATENT DOCUMENTS

| 2,151,997 | 3/1939 | Springer et al. | 343/713 |
| 2,774,811 | 12/1956 | Shanok et al. | 343/713 |
| 3,646,561 | 2/1972 | Clarke | 343/713 |

Primary Examiner—Alfred E. Smith
Assistant Examiner—David K. Moore
Attorney, Agent, or Firm—Shanley, O'Neil & Baker

[57] ABSTRACT

A radio antenna for use on a motorcycle having a windshield mounted on a non-conducting fairing. The antenna includes an elongated metal rod member shaped to conform to and extending along the edge of the windshield around at least a substantial portion of its periphery and being connected at one end to a flexible conductor by means of a fastener extending through the non-conducting windshield and fairing, with the flexible conductor leading to radio means carried by the motorcycle.

7 Claims, 5 Drawing Figures

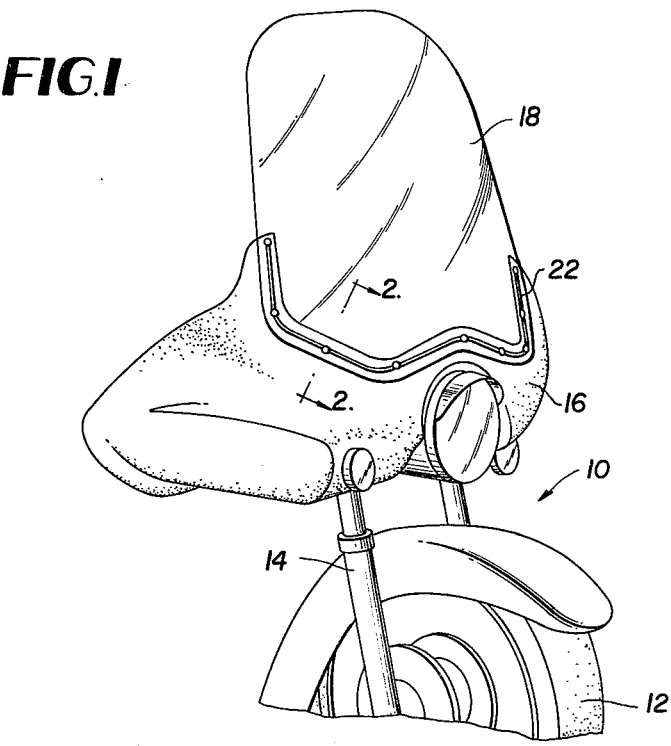
FIG.1

FIG.4

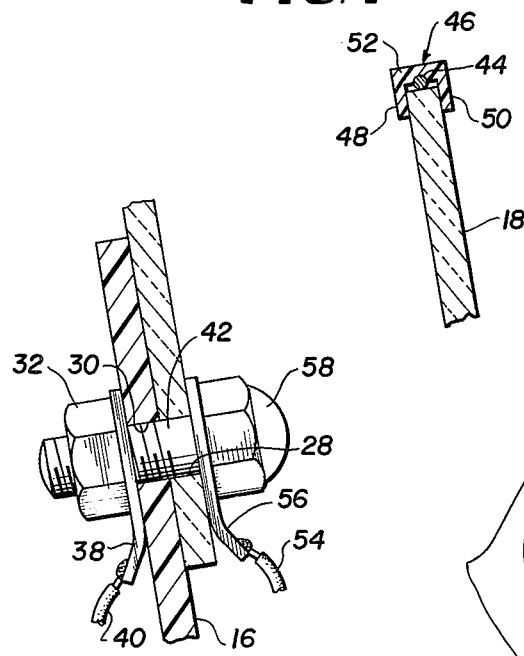
FIG.5

4,132,994

RADIO ANTENNA FOR MOTORCYCLE

BACKGROUND OF THE INVENTION

1. Field of the Invention

This invention relates to radio antennas and more particularly to an improved safety antenna for use on motorcycle-type vehicles.

2. Description of the Prior Art

Radio antennas employed on motorcycle-type vehicles are conventionally of the whip-type, consisting of an elongated metal rod mounted on and projecting upwardly from the vehicle. In order to avoid interference with normal use of the vehicle, such whip antennas are normally mounted on the molded synthetic resin fairing mounted on the front of the motorcycle. While good reception is provided by such an antenna, the almost constant flexing created by the movement of the motorcycle, wind resistance of the antenna, and the like can cause fatigue resulting in failure of the fairing surrounding the mounting assembly. Such failures are not only expensive, making it necessary to either repair or replace the fairing, but also dangerous since the antenna can become dislodged while travelling at high speed. Also, in an accident, a whip-type antenna frequently becomes broken off, with the projecting shaft mounted on the vehicle becoming a spear or lance which is a real danger to the cyclist. Further, because of the increased wind resistance and reverse balance pole effect of whip antennas, the cyclist's control of the motorcycle can be adversely affected.

It is also known to incorporate radio antennas in a vehicle windshield, and such antennas are frequently used on automobiles. In such antennas, the conducting metal strip is laminated between the glass sheets of the windshield, and special connectors are provided at the edge of the rigid glass structure for attachment to a cable leading to the radio equipment. Since the antenna is incorporated in the sight portion of the windshield, it is necessary to employ a very thin conductor in order to avoid interference with vision through the windshield. The thin, delicate nature of the conductor makes it essential that it be contained between the laminated glass sheets in order to avoid damage as when washing the windshield or the like.

SUMMARY OF THE INVENTION

It is the primary object of the present invention to provide a radio antenna for use on motorcycle vehicles which provides advantages of both the whip-type and the laminated windshield type prior art antennas while avoiding drawbacks of both.

It is a particular object of the present invention to provide a radio antenna which includes an elongated conductor member extending along the edge of a motorcycle windshield, around at least a substantial portion of its periphery, but which conductor is not laminated into the body of the windshield.

In the attainment of the foregoing and other objects, an important feature of the invention resides in providing a radio antenna in the form of an elongated conductor shaped to closely conform to the configuration of the peripheral edge portion of a motorcycle windshield and mounting the conductor either directly onto or closely adjacent the peripheral edge, at least around a substantial portion of the windshield. One end of the metal antenna is secured to a flexible conductor by screw fastener means extending through the non-conducting fairing and mounting the windshield on the motorcycle.

In one embodiment of the invention, the elongated metal antenna member is in the form of a metal rod shaped to conform closely to the configuration of the bottom portion of the windshield in the area of attachment to the non-metallic fairing. The antenna rod is supported in outwardly spaced relation on the forward edge of the windshield by metal bolts having an eye formed in the head and extending around the metal rod. The body of the bolts extend through the fairing and windshield and nuts are threaded onto the bolt bodies to mount the windshield on the fairing. By using a polished metal eye bolt head and antenna rod, the antenna and mounting means become an attractive ornamentation for the windshield, effectively concealing its primary function. The elongated metal rod serves the same function as the conventional whip antenna; however, the metal rod is firmly secured at close intervals along its length to the base of the windshield and to the fairing so that there is little tendency for the antenna to become broken in an accident. Further, even if the antenna is broken, it is not mounted in a position to leave an upwardly-projecting lance which is likely to injure the rider.

In an alternate embodiment of the invention, the elongated metal antenna member is positioned along the outer edge of the windshield and retained in position by a nonconducting protective edge trim or cap firmly adhered to the peripheral edge of the windshield. In this embodiment, the antenna member may be a flexible metallic wire or the like which will easily conform to the configuration of the windshield edge.

BRIEF DESCRIPTION OF THE DRAWINGS

The foregoing and other features and advantages of the invention will become apparent from the detailed description contained hereinbelow, taken in conjunction with the drawings, in which:

FIG. 1 is a perspective view of the front portion of a motorcycle vehicle having an improved antenna according to the present invention mounted thereon;

FIG. 4 is an enlarged fragmentary sectional view taken on line 4—4 of FIG. 3; and FIG. 5 is an enlarged fragmentary sectional view taken on line 5—5 of FIG. 3.

DESCRIPTION OF THE PREFERRED EMBODIMENTS

Figure 2:
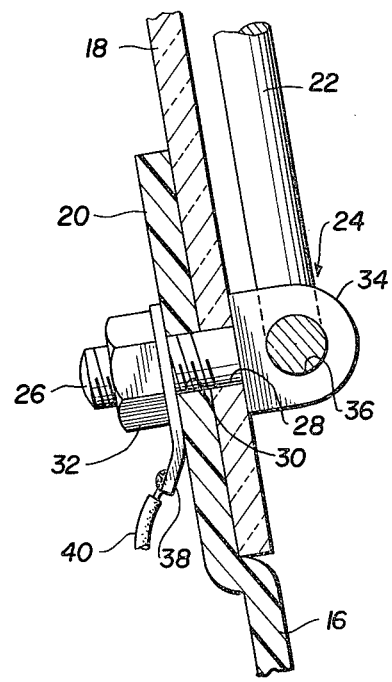
FIG. 2 is an enlarged fragmentary sectional view taken on line 2—2 of FIG. 1.

Referring now to the drawings in detail, the front portion of a motorcycle vehicle 10 is illustrated in FIG. 1 as including a wheel assembly 12 mounted on a fork structure 14 for steering movement in the conventional manner. A molded fairing 16 is mounted on the forward end of the motorcycle and is shaped to cooperate with structure components of the vehicle to provide an effective air shield for a rider of the vehicle while offering minimum wind resistance.

A transparent windshield 18 is mounted on the fairing 16 with the bottom side edge portion of the windshield extending in overlapping relation with a flange portion 20 extending around an upwardly-directed, generally U-shaped recess in the top of the fairing. The windshield is non-conducting and preferably made from a shatter-proof synthetic resin material such as an acrylic resin sold under the trademark Plexiglas. The fairing 16 may be molded from a glass fiber reinforced high-strength synthetic resin material.

In accordance with the embodiment of the invention illustrated in FIGS. 1 and 2, an elongated polished metal rod 22 is shaped to conform to the configuration of the bottom peripheral edge portion of the windshield and is mounted forward of the flange 20 in outwardly-spaced relation to the bottom edge of the windshield. Rod 22 has a length to act as an effective radio receiver antenna and is insulated from the metallic body of the motorcycle vehicle by being mounted on the non-conducting windshield 18 and fairing 16. A plurality of eye bolts 24 have their threaded shafts 26 extending through openings 28, 30 in the windshield 18 and flange 20, respectively, and nuts 32 threaded onto the shafts 26 firmly clamp the windshield and fairing together. The eye bolts each have enlarged rounded heads 34 having a circular opening forming an eye 36 extending at right angles to the longitudinal axis of the shaft 26.

The elongated polished rod 22 extends through and is supported by the eye bolts, with the head of the eye bolt acting as a spacer supporting the rod in outwardly-spaced relation to the forward surface of the windshield. Perferably, the heads 34 of the eye bolts are polished, as by being chromeplated, so that the polished surface of the rounded eye bolt heads and the antenna rod 22 present an attractive trim for ornamentation around the overlapping juncture of the fairing and windshield. The antenna rod holds the eye bolts against turning, thereby facilitating installation of the nuts 32 to mount the windshield on the fairing and to assure against undesired turning of the bolts tending to loosen the windshield.

A connector tab 38 formed of an electrically-conductive metal is mounted under one of the nuts 32, between the nut and the rear surface of the flange 20. An electrically-insulated, flexible conductor 40 is joined, as by soldering, to the connector tab 38 and extends to radio equipment mounted on the motorcycle to conduct signals from the antenna rod 22 to the radio.

Figure 3:
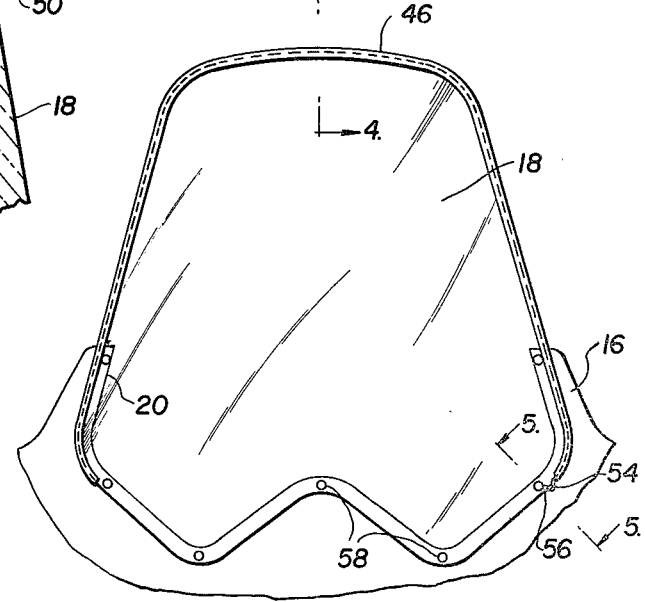
FIG. 3 is a front elevation view of a portion of the structure shown in FIG. 1 and including an alternate embodiment of the radio antenna.

In the embodiment of the invention shown in FIGS. 3 – 5, the windshield 18 is mounted on the fairing 16 by a plurality of bolts 42 extending through the openings 28, 30 in the windshield and flange, with nuts 32 firmly clamping the windshield and fairing flange together. The flexible conductor 40 is in electrical contact with one of the bolts 42, through the connector 38 clamped beneath the nut 32.

An elongated antenna element 44 is shaped to conform to the upwardly-directed peripheral edge surface of the windshield 18 and is firmly held in position in contact with this edge surface by an elongated flexible mounting strip 46. The mounting strip 46 is substantially C-shaped in cross-section, with opposed legs 48, 50 integrally formed with the body portion 52 and spaced apart a distance sufficient to frictionally engage the opposed side edge surfaces of the windshield 18. A suitable adhesive material, not shown, may be employed to firmly retain the strip 46 in position around the peripheral edge of the windshield 18, with the antenna element 44 firmly clamped between the edge of the windshield and the body 52 of the retaining strip. As shown in FIG. 3, the ends of the retaining strip 46 preferably extend below the top of the flange 20 of the fairing 16 so that, when the windshield 18 is mounted, the ends of strip 46 are firmly retained in position.

One end 54 of the antenna member 44 is attached to a connecting tab 56 which extends beneath the head 58 of the bolt 42 which is in electrical contact with the conductor 40. Thus, electrical contact is made, from the antenna 44, through one of the bolts 42 to the conductor 40 to conduct signals from the antenna to radio equipment carried by the motorcycle. The length of the antenna member 44 can be selected to provide the maximum signal strength; however, for conventional motorcycle vehicles, the antenna, whether extending around the top or bottom of the windshield, will extend along at least a substantial portion of the windshield.

The antenna element 44 may, if desired, be in the form of a flexible wire member retained in position around the peripheral edge of the windshield. Alternatively, member 44 can be a solid rod member, such as the rod 22 which is either pre-formed or custom-shaped to fit the edge of the windshield 18.

It is believed apparent that the antenna structure described in each embodiment above employs the insulating qualities of the non-conductive windshield and the molded fairing to isolate the antenna from the structure of the vehicle frame. The invention provides an attractive, built-in antenna acting as an ornamentation for the vehicle while concealing the antenna function. By employing a relatively heavy rod 22 in the embodiment of FIGS. 1 and 2, the antenna can be employed to reinforce the windshield and fairing. In the embodiment shown in FIGS. 3 – 5, the retaining strip 46 preferably is formed from a relatively soft material such as a transparent vinyl which acts as a protective strip for the edge of the windshield as well as a retaining cap or strip for the antenna conductor.

The present invention makes it possible to use a relatively large, elongated metallic antenna structure while avoiding the usual drawbacks inherent in a whip-type antenna mounted on a motorcycle vehicle. Thus, the antenna according to the present invention does not interfere with normal use of the vehicle, avoids fatigue of the mounting structure, and avoids the reverse balance pole and adverse control effects of the usual whip antennas. More important, however, the antennas do not present any hazard to motorcyclists in the event of an accident. Since the antenna structure is firmly retained in close proximity to or in direct contact with other structure, the probability or possibility of a broken antenna element acting as a spear or lance to injure a motorcyclist is substantially eliminated.

While I have disclosed and described preferred embodiments of my invention, I wish it understood that I do not intend to be restricted solely thereto, but rather that I do intend to include all embodiments thereof which would be apparent to one skilled in the art and which come within the spirit and scope of my invention.

I claim:

1. A radio antenna structure for use on a motorcycle having a transparent non-conducting windshield and a non-conducting fairing supported on the vehicle, the antenna structure comprising, in combination, an elongated metal antenna member shaped to closely conform to the contour of the edge portion of the windshield around at least a substantial portion of its periphery, mounting means supporting said metal antenna member in fixed position extending adjacent said substantial portion of said edge of said windshield, a plurality of elongated metal fasteners extending through said windshield and said fairing and mounting said windshield on a forwardly-directed surface of the fairing, means establishing an electrical connection between said antenna member and at least one of said elongated metal fasteners forward of said windshield, and flexible conductor means connected to said at least one fastener means rearwardly of said fairing for conducting signals from the antenna member to radio equipment on the motorcycle.

2. The invention as defined in claim 1 wherein said elongated metal antenna member comprises a polished rigid metal rod shaped to conform to the contours of the edge of the lower portion of said windshield.

3. The invention as defined in claim 2 wherein said elongated metal fasteners comprise bolts having enlarged heads, said heads each having an eye extending therethrough at substantially right angles to the longitudinal axis of the bolt, said eyes being of a dimension to snugly receive and support said elongated antenna member to mount the antenna member and provide said electrical connection between said antenna member and said at least one of said metal fasteners.

4. The invention as defined in claim 2 wherein said eye means are formed in position to support said metal antenna member in outwardly-spaced relation with respect to said windshield, and enlarged heads being smooth and having a polished surface whereby said enlarged heads and the polished metal rod cooperate to provide an ornamental trim along the juncture of the windshield and fairing of the motorcycle.

5. The invention as defined in claim 1 wherein said elongated metal antenna member is shaped to closely conform to the top edge portion of the windshield and wherein said mounting means comprises a molded synthetic resin mounting strip extending around the edge of the windshield and supporting the metal antenna member in direct contact with the edge surface of the windshield.

6. The invention as defined in claim 5 wherein said molded synthetic resin strip comprises an elongated flexible molding having a substantially C-shaped cross-section, said flexible molding providing an effective edge protector for the windshield.

7. The invention as defined in claim 5 wherein said elongated metal antenna member comprises a length of flexible wire having one end connected to said elongated metal fastener means forward of said windshield.

* * * * *